US012596211B2

(12) United States Patent
Liu

(10) Patent No.: US 12,596,211 B2
(45) Date of Patent: Apr. 7, 2026

(54) ANTI-PEEPING FILM AND DISPLAY DEVICE

(71) Applicant: Wuhan China Star Optoelectronics Technology Co., Ltd., Wuhan (CN)

(72) Inventor: Guangkun Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 308 days.

(21) Appl. No.: 18/239,781

(22) Filed: Aug. 30, 2023

(65) Prior Publication Data

US 2024/0077659 A1 Mar. 7, 2024

(30) Foreign Application Priority Data

Sep. 5, 2022 (CN) .......................... 202211078393.9

(51) Int. Cl.
*G02B 5/20* (2006.01)
*G02F 1/1335* (2006.01)
*G09F 9/30* (2006.01)

(52) U.S. Cl.
CPC ............... *G02B 5/201* (2013.01); *G09F 9/30* (2013.01); *G02F 1/133512* (2013.01)

(58) Field of Classification Search
CPC ...... G02B 5/201; G09F 9/30; G02F 1/133512
See application file for complete search history.

(56) References Cited

U.S. PATENT DOCUMENTS

2014/0110040 A1* 4/2014 Cok .................. C23C 16/45525
156/196
2019/0243154 A1* 8/2019 Hai .................... G06V 40/1318
(Continued)

FOREIGN PATENT DOCUMENTS

CN 207037298 2/2018
CN 108490703 9/2018
(Continued)

OTHER PUBLICATIONS

Notification of Office Action and Search Report Dated Jul. 26, 2023 From The State Intellectual Property Office of the People's Republic of China Re. Application No. 202211078393.9 and Its Translation Into English. (19 Pages).

*Primary Examiner* — Ryan Crockett

(57) ABSTRACT

An anti-peeping film and a display device are provided. The anti-peeping film includes multiple anti-peeping layers. Each anti-peeping layer includes light-blocking portions and light-transmissive portions. The light-blocking portions are arranged in parallel. Each light-transmissive portion is connected between adjacent two light-blocking portions. The anti-peeping film includes multiple anti-peeping layers, each anti-peeping layer includes multiple equidistant light-blocking portions and multiple light-transmissive portions, a ratio of a width of the light-blocking portion in an arrangement direction to a width of the light-transmissive portion in the arrangement direction ranges from 0.045:1 to 0.088:1. Accordingly, a proportion of the area occupied by the light-transmissive portions is increased, leading to an enhancement in the light transmittance of the anti-peeping film. The presence of the light-blocking portions guarantees the light-blocking effect of the anti-peeping film. Therefore, both anti-peeping effectiveness and high light transmittance can be achieved at the same time.

19 Claims, 3 Drawing Sheets

(56)        References Cited

U.S. PATENT DOCUMENTS

2021/0109388 A1*   4/2021   You ..................... G02F 1/13306
2021/0397395 A1*  12/2021   Koo ..................... G06F 1/1609
2023/0052905 A1*   2/2023   Koito ................. G02F 1/13471
2023/0073297 A1*   3/2023   Nagasawa ............. G02F 1/1337

FOREIGN PATENT DOCUMENTS

CN        211293322        8/2020
CN        112394548        2/2021
CN        113703226       11/2021
CN        114167603        3/2022

* cited by examiner

ANTI-PEEPING FILM AND DISPLAY DEVICE

RELATED APPLICATION

This application claims the benefit of priority of Chinese Patent Application No. 202211078393.9 filed on Sep. 5, 2022, the contents of which are incorporated herein by reference in their entirety.

FIELD OF DISCLOSURE

The present application relates to a field of display technology and in particular, to an anti-peeping film and a display device.

DESCRIPTION OF RELATED ART

Display devices have been playing an increasingly significant role in people's lives and work. To safeguard personal privacy and confidential work information, current display devices often utilize anti-peeping films to achieve the effect of anti-peeping.

While conventional anti-peeping films provide anti-peeping functions, they have a drawback. The reduced light transmission caused by the anti-peeping films results in a dimmer screen, leading to visual fatigue for the viewers. Although increasing screen brightness can improve the display brightness, it comes at the cost of higher power consumption, thus reducing the battery life of electronic devices. Balancing the anti-peeping effectiveness with high light transmission of the anti-peeping films has proven challenging. Therefore, there is an urgent need to develop a new type of anti-peeping films that can simultaneously ensure the effect of anti-peeping and enhance light transmission.

SUMMARY OF INVENTION

The present application provides an anti-peeping film and a display device, aiming to address the technical issue in conventional anti-peeping films where a balance between the effectiveness of anti-peeping function and high light transmission cannot be achieved simultaneously.

Accordingly, the present application provides an anti-peeping film, including a plurality of anti-peeping layers stacked on each other, wherein each of the anti-peeping layers includes:

multiple light-blocking portions arranged in parallel; and a plurality of light-transmissive portions, each of the light-transmissive portions connected between adjacent two of the light-blocking portions;

wherein a ratio of a width of each of the light-blocking portions in an arrangement direction to a width of each of the light-transmissive portions in the arrangement direction ranges from 0.045:1 to 0.088:1.

In the anti-peeping film of the present application, each of the light-blocking portions comprises a first film layer and a second film layer, wherein in each of the light-blocking portions, a light transmittance of the second film layer is lower than a light transmittance of the first film layer, and a thickness of the second film layer is smaller than a thickness of the first film layer.

In the anti-peeping film of the present application, a number of the anti-peeping layers comprised in the anti-peeping film is from 800 to 8000 layers.

In the anti-peeping film of the present application, along a direction from a light incident surface of the anti-peeping film towards a light exit surface of the anti-peeping film, the anti-peeping film includes a first anti-peeping portion, a second anti-peeping portion, and a third anti-peeping portion stacked on each other; and each of the first anti-peeping portion, the second anti-peeping portion, and the third anti-peeping portion includes multiple ones of the anti-peeping layers, a refractive index of each of the light-transmissive portions in the first anti-peeping portion is lower than a refractive index of each of the light-transmissive portions in the second anti-peeping portion, and a refractive index of each of the light-transmissive portions in the second anti-peeping portion is lower than a refractive index of each of the light-transmissive portions in the third anti-peeping portion.

In the anti-peeping film of the present application, the first anti-peeping portion, the second anti-peeping portion, and the third anti-peeping portion include different numbers of the anti-peeping layers.

In the anti-peeping film of the present application, a spacing between adjacent two of the light-blocking portions in the second anti-peeping portion is m times a spacing between adjacent two of the light-blocking portions in the first anti-peeping portion, and a spacing between adjacent two of the light-blocking portions in the second anti-peeping portion is n times a spacing between adjacent two of the light-blocking portions in the third anti-peeping portion; and wherein m and n are integers greater than 1.

In the anti-peeping film of the present application, a width of each of the light-blocking portions ranges from greater than 0 micrometers to less than or equal to 1 micrometer; and a thickness of each of the anti-peeping layers ranges from 30 nanometers to 150.02 nanometers.

In the anti-peeping film of the present application, a cross-sectional shape of each of the light-blocking portions includes a rectangle, and a material of the light-blocking portions comprises black dye.

In the anti-peeping film of the present application, the anti-peeping film further includes a base layer disposed on a light incident surface of the anti-peeping film and a functional layer disposed on a light exit surface of the anti-peeping film.

The present application further provides a display device, including the anti-peeping film mentioned above.

Advantages: The present application provides an anti-peeping film and a display device. The anti-peeping film includes multiple anti-peeping layers. Each anti-peeping layer includes multiple light-blocking portions and multiple light-transmissive portions. The light-blocking portions are arranged in parallel. Each light-transmissive portion is connected between adjacent two light-blocking portions. The ratio of the width of the light-blocking portion in the arrangement direction to the width of the light-transmissive portion in the arrangement direction ranges from 0.045:1 to 0.088:1. In the present application, the anti-peeping film includes multiple anti-peeping layers. Each anti-peeping layer includes multiple equidistant light-blocking portions and one light-transmissive portion arranged between each two adjacent light-blocking portions. Further, the ratio of the width of the light-blocking portion to the width of the light-transmissive portion ranges from 0.045:1 to 0.088:1. Consequently, a proportion of the area occupied by the light-transmissive portions is increased, leading to an enhancement in the light transmittance of the anti-peeping film. The presence of multiple light-blocking portions guarantees the light-blocking effect of the anti-peeping film. As a result, both anti-peeping effectiveness and high light transmittance can be achieved simultaneously.

BRIEF DESCRIPTION OF DRAWINGS

The technical solutions and other advantages of the present application will be apparent through the detailed description of the specific embodiments of the present application below in conjunction with the accompanying drawings.

Figure 1:
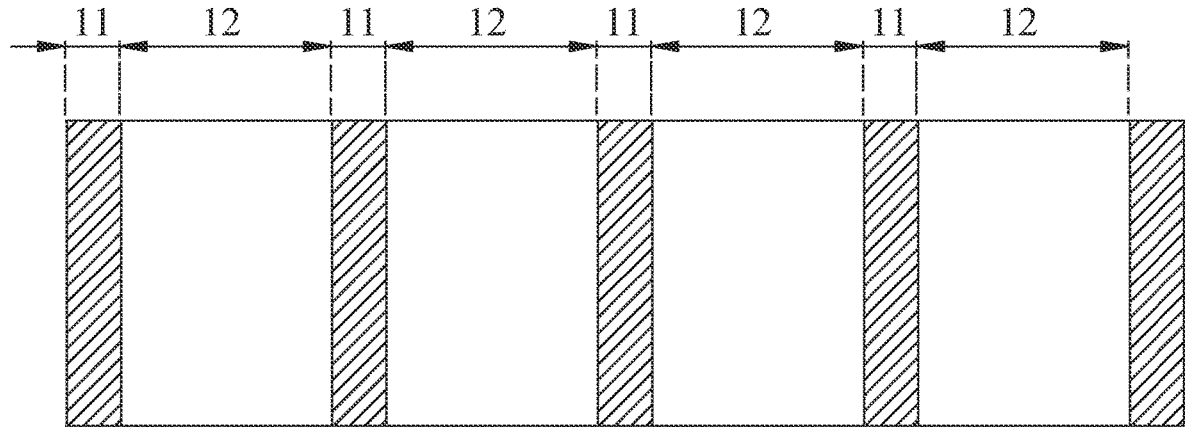
FIG. 1 is a schematic top view of an anti-peeping film of the present application.

REFERENCE SIGNS IN THE DRAWINGS anti-peeping layer 10, light-blocking portion 11, light-transmissive portion 12, anti-peeping angle A, first film layer 111, second film layer 112, first anti-peeping portion 101, second anti-peeping portion 102, third anti-peeping portion 103, spacing between adjacent two light-blocking portions in the first anti-peeping portion P1, spacing between adjacent two light-blocking portions in the second anti-peeping portion P2, spacing between adjacent two light-blocking portions in the third anti-peeping portion P3, first light ray S1, second light ray S2, third light ray S3, base layer 113, functional layer 114, first direction X, second direction Y.

DETAILED DESCRIPTION OF EMBODIMENTS

The technical solutions in the embodiments of the present application will be clearly and completely described below in conjunction with the accompanying drawings. Apparently, the described embodiments are only some of the embodiments of the present application, not all of them. Based on the embodiments in the present application, all other embodiments obtained by those skilled in the art without making creative efforts should be deemed to fall within the protection scope of this application. In addition, it should be understood that the specific embodiments described here are only used to illustrate and explain the present application, and are not intended to limit the present application. In the present application, unless stated to the contrary, the directional words such as "up" and "down" usually refer to "up" and "down" in the actual use or working state of the device, specifically the directions shown in the drawings; while "inside" and "outside" are referred to in relation to an outline of the device.

Although conventional anti-peeping films provide anti-peeping functions, they reduce the light transmission, resulting in a dimmer screen that can lead to visual fatigue. While increasing screen brightness can enhance display brightness, it also raises power consumption, thereby reducing the battery life of electronic devices. Balancing the anti-peeping effectiveness of the anti-peeping films with high light transmission proves challenging. Therefore, there is an urgent need to develop an anti-peeping film that ensures anti-peeping functionality while improving light transmission. The present application proposes the following technical solutions to address the aforementioned issues.

The present application provides an anti-peeping film. The anti-peeping film includes a plurality of anti-peeping layers 10 stacked on each other. Each of the anti-peeping layers 10 includes multiple light-blocking portions 11 and a plurality of light-transmissive portions 12. The light-blocking portions 11 are arranged in parallel. Each of the light-transmissive portions 12 is connected between adjacent two of the light-blocking portions 11. A ratio of a width of the light-blocking portion 11 in an arrangement direction to a width of the light-transmissive portion 12 in the arrangement direction ranges from 0.045:1 to 0.088:1.

In the present application, the anti-peeping film includes the anti-peeping layers 10. Each of the anti-peeping layers 10 consists of multiple equidistant light-blocking portions 11 and one light-transmissive portion 12 disposed between adjacent two light-blocking portions 11. This arrangement ensures that the ratio of the width of the light-blocking portion 11 to the width of the light-transmissive portion 12 is in a range of 0.045:1 to 0.088:1. This design enhances a proportion of the area occupied by the light-transmissive portions 12. Because the light-transmissive portions 12 have a higher light transmittance than the light-blocking portions 11, thus improving the overall light transmission of the anti-peeping film. The inclusion of the light-blocking portions 11 guarantees effective light-blocking performance. Consequently, both anti-peeping effectiveness and high light transmission are simultaneously accomplished.

Figure 2:
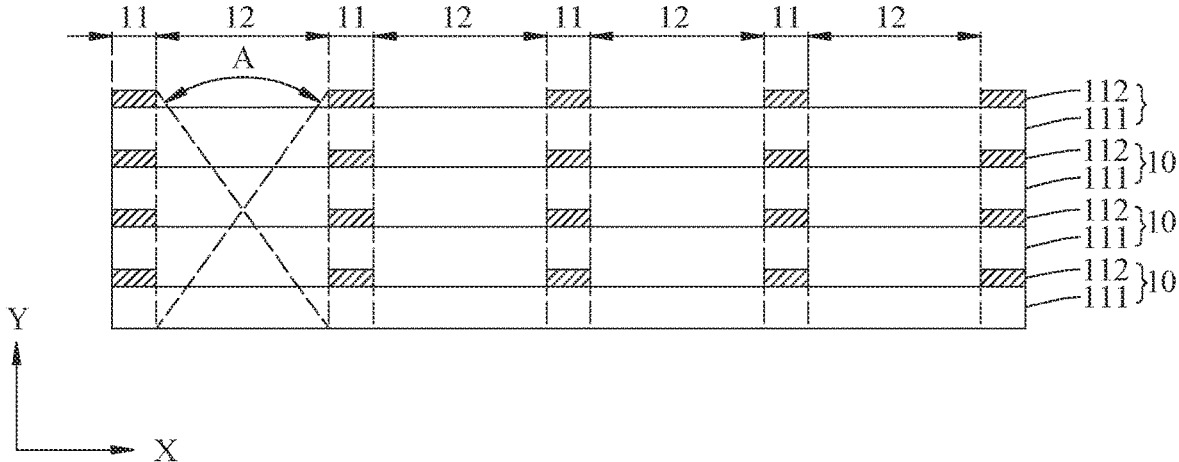
FIG. 2 is a schematic view of a first cross-sectional structure of the anti-peeping film of the present application.
Figure 3:
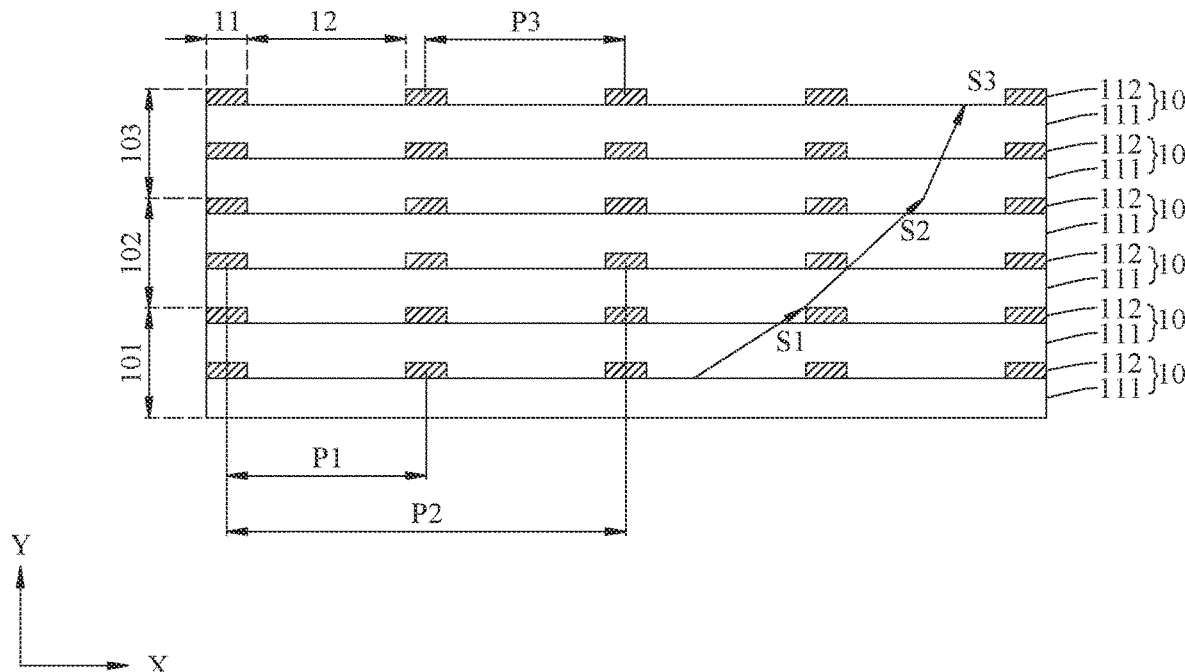
FIG. 3 is a schematic view of a second cross-sectional structure of the anti-peeping film of the present application.
Figure 4:
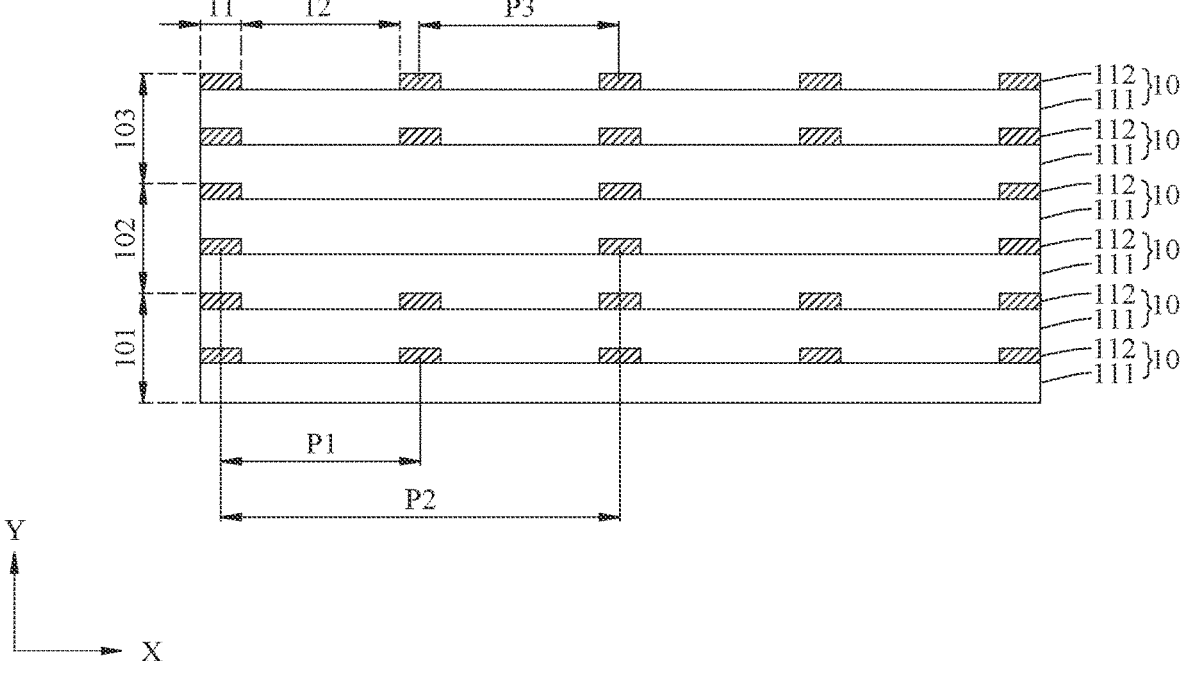
FIG. 4 is a schematic view of a third cross-sectional structure of the anti-peeping film of the present application.
Figure 5:
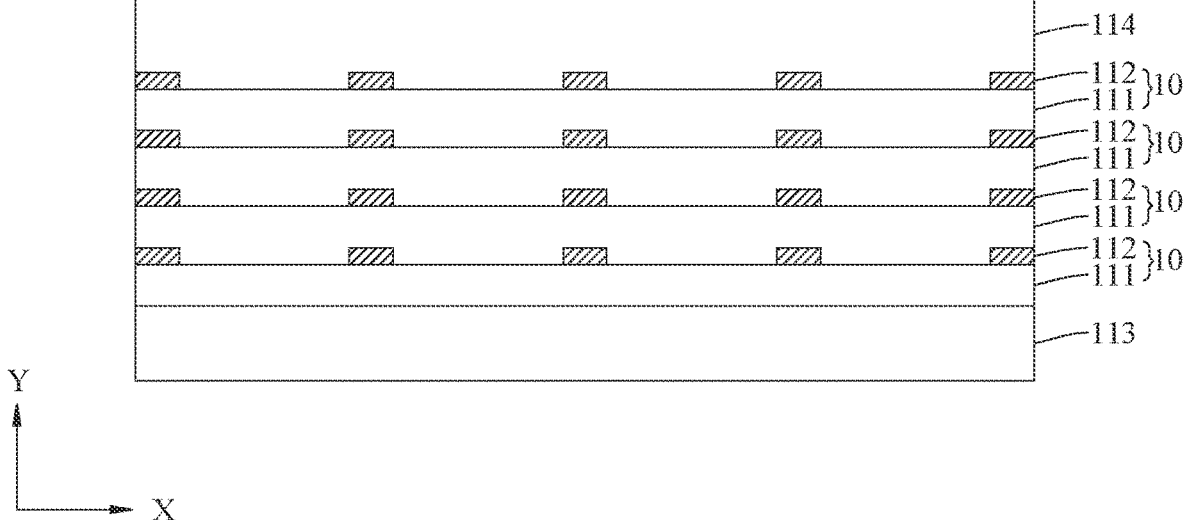
FIG. 5 is a schematic view of a fourth cross-sectional structure of the anti-peeping film of the present application.

FIG. 1 is a schematic top view of an anti-peeping film of the present application. FIG. 2 is a schematic view of a first cross-sectional structure of the anti-peeping film of the present application. FIG. 3 is a schematic view of a second cross-sectional structure of the anti-peeping film of the present application. FIG. 4 is a schematic view of a third cross-sectional structure of the anti-peeping film of the present application. FIG. 5 is a schematic view of a fourth cross-sectional structure of the anti-peeping film of the present application. FIG. 4 shows a modification based on FIG. 3, where a spacing P1 between adjacent light-blocking portions of the first anti-peeping portion, a spacing P2 between adjacent light-blocking portions of the second anti-peeping portion, and a spacing P3 between adjacent light-blocking portions of the third anti-peeping portion are set to be different.

Please refer to FIG. 1 to FIG. 2. In all embodiments of the present application, a width refers to a dimension in a first direction X, and a thickness refers to a dimension in a second direction Y. A light incident surface of the anti-peeping film refers to a side of the anti-peeping film where light enters the anti-peeping film in the second direction Y. A light exit surface of the anti-peeping film refers to a surface in the second direction Y from which light exits. That is to say, in FIG. 2, a lower surface of the anti-peeping film is the light incident surface, and an upper surface is the light exit surface. The light incident surface is attached to a light-emitting side of a display panel to provide an anti-peeping effect for the display panel, and the light exit surface faces observers for the observers to watch a display screen.

In the present application, the light transmittance relates to a ratio of the brightness of the display panel, after the anti-peeping film is attached, to the brightness of the display panel before the anti-peeping film is attached, with all other conditions remain unchanged. The light transmittance of the anti-peeping film of the present application can reach more than 90%.

Please refer to FIGS. 1 to 2. The anti-peeping film includes multiple light-blocking portions 11 and light-transmissive portions 12. Each light-blocking portion 11 is alternately arranged with one light-transmissive portion 12, such that each light-transmissive portion 12 is positioned between adjacent two light-blocking portions 11. The widths of the light-blocking portions 11 are the same, and the widths of the light-transmissive portions 12 are the same. The light-blocking portions 11 and the light-transmissive portions 12 form a micro-louver structure. The light-blocking portions 11 can block light, while the light-transmissive portions 12 allow light to pass through. An anti-peeping angle A of the anti-peeping film is determined by the width of the light-transmissive portion 12 and a total thickness of the stacked anti-peeping layers 10. The light transmittance of the anti-peeping film is influenced by the ratio of the width of the light-blocking portion 11 to the width of the light-transmissive portion 12.

The anti-peeping film of the present application comprises multiple anti-peeping layers 10 stacked on each other, and adjacent two anti-peeping layers 10 are arranged in contact without leaving a gap, so as to ensure that light does not experience refraction to affect the light transmittance due to the presence of air between adjacent layers.

Please refer to FIG. 2. In the cross-sectional view of the anti-peeping film, a boundary of a light-transmissive portion 12 forms a rectangle. An angle formed by the diagonals of this rectangle, facing directly towards a light-emitting direction, is the anti-peeping angle A. The larger the anti-peeping angle A, the better the anti-peeping effect, and the smaller the anti-peeping angle A, the inferior the anti-peeping effect.

The size of the anti-peeping angle A can be adjusted by adjusting the spacing of the light-blocking portions 11 of the anti-peeping film and the total thickness of the stacked anti-peeping layers. The anti-peeping angle A can be set to various degrees, such as 48 degrees, 60 degrees, and 90 degrees, and the present application is not limited in this regard.

In this embodiment, please refer to FIG. 1. The arrangement direction of the light-blocking portions 11 is defined as the first direction X. In the first direction X, the ratio of the width of the light-blocking portion 11 to the width of the light-transmissive portion 12 ranges from 0.045:1 to 0.088: 1. This enhances the proportion of the area occupied by the light-transmissive portions 12 and increases the light transmittance of the anti-peeping film.

In the anti-peeping film of the present application, the light-blocking portion 11 comprises a first film layer 111 and a second film layer 112. The light transmittance of the second film layer 112 is lower than the light transmittance of the first film layer 111, and the thickness of the second film layer 112 is smaller than the thickness of the first film layer 111.

In the present embodiment, please refer to FIG. 2. In each of the anti-peeping layers 10, the light-blocking portion 11 includes the first film layer 111 and the second film layer 112. The first film layer 111 and the second film layer 112 are stacked and in contact with each other. The light-transmissive portion 12 includes the first film layer 111. The light transmittance of the second film layer 112 is lower than the light transmittance of the first film layer 111. The second film layer 112 can include black dye or a light-blocking material, while the first film layer 111 is made of a light-transmissive material. For instance, the material of the first film layer 111 includes resin, and the material of the second film layer 112 includes black ink.

In the present embodiment, in the second direction Y, the thickness of the second film layer 112 is smaller than the thickness of the first film layer 111. For example, the thickness of the first film layer 111 ranges from 30 nanometers to 150 nanometers, while the thickness of the second film layer 112 ranges from 0.002 nanometers to 0.02 nanometers. In some embodiments, the thickness of the second film layer 112 is 0.005 nanometers, and the thickness of the first film layer 111 is 50 nanometers. Due to the significant difference in thickness between the first film layer 111 and the second film layer 112, a total thickness of the light-transmissive portion 12 is close to a total thickness of the light-blocking portion 11. In FIGS. 2 to 4 of the present application, in order to clearly illustrate a positional relationship between the first film layer 111 and the second film layer 112, the thickness relationship between the first film layer 111 and the second film layer 112 is not shown.

In the anti-peeping film of the present application, a number of the anti-peeping layers comprised in the anti-peeping film is from 800 to 8000 layers.

In the present embodiment, since the total thickness of the light-blocking portion 11 is different from the total thickness of the light-transmissive portion 12 of the anti-peeping layer 10, specifically, a difference between the total thickness of the light-blocking portion 11 and the total thickness of the light-transmissive portion 12 is equal to a total thickness of the second film layer 112, there exists a discontinuity (level difference) resulting from the difference in total thickness between the light-blocking portion 11 and the light-transmissive portion 12 of the anti-peeping layer 10. When multiple anti-peeping layers 10 are stacked, each two adjacent ones of the anti-peeping layers 10 are tightly adhered without leaving gaps, and the light-transmissive portions 12 of each two adjacent anti-peeping layers 10 fill each other. In this arrangement, the total thickness of the light-blocking portion 11 is greater than the total thickness of the light-transmissive portion 12.

In some embodiments, the anti-peeping film is composed of 7600 layers of anti-peeping layers 10 stacked together, resulting in a total thickness of the anti-peeping film of 0.38 millimeters. The total thickness of the light-blocking portion 11 is 38 nanometers greater than the total thickness of the light-transmissive portion 12. Due to the significantly larger thickness of the first film layer 111 compared to the second film layer 112, the final thickness discontinuity (height difference) between the light-blocking portion 11 and the light-transmissive portion 12 is minimal, which does not affect the surface smoothness of the anti-peeping film.

In some embodiments, the anti-peeping film is composed of 6000 layers of anti-peeping layers 10 stacked on each other. A total thickness of the anti-peeping film is 0.3 millimeters. The total thickness of the light-blocking portion 11 is 30 nanometers greater than the total thickness of the light-transmissive portion 12. Due to the significantly larger thickness of the first film layer 111 compared to the second film layer 112, the final thickness discontinuity between the light-blocking portion 11 and the light-transmissive portion 12 is minimal, which does not affect the surface smoothness of the anti-peeping film.

In the present embodiment, the thickness of the anti-peeping film ranges from 0.04 mm to 0.4 mm.

In the anti-peeping film of the present application, along a direction from the light incident surface of the anti-peeping film towards the light exit surface of the anti-peeping film, the anti-peeping film includes a first anti-peeping portion 101, a second anti-peeping portion 102, and a third anti-peeping portion 103 sequentially stacked on each other.

Each of the first anti-peeping portion 101, the second anti-peeping portion 102, and the third anti-peeping portion 103 includes multiple anti-peeping layers 10. A refractive index of the light-transmissive portion 12 in the first anti-peeping portion 101 is smaller than a refractive index of the light-transmissive portion 12 in the second anti-peeping portion 102, and a refractive index of the light-transmissive portion 12 in the second anti-peeping portion 102 is smaller than a refractive index of the light-transmissive portion 12 in the third anti-peeping portion 103.

In the present embodiment, as shown in FIG. 3, in the second direction Y, the first anti-peeping portion 101, the second anti-peeping portion 102, and the third anti-peeping portion 103 are stacked on each other. Each of the first anti-peeping portion 101, the second anti-peeping portion 102, and the third anti-peeping portion 103 includes sequentially stacked multiple anti-peeping layers 10. For example, when the number of the anti-peeping layers 10 included in the anti-peeping film is 900 layers, the first anti-peeping portion 101 can include 300 anti-peeping layers 10, the second anti-peeping portion 102 can include 300 anti-peeping layers 10, and the third anti-peeping portion 103 can include 300 anti-peeping layers 10. It should be noted that the number of the anti-peeping layers 10 included in the first anti-peeping portion 101, the second anti-peeping portion 102, and the third anti-peeping portion 103 can be set to be equal or unequal.

The number of the anti-peeping layers 10 included in the first anti-peeping portion 101, the second anti-peeping portion 102, and the third anti-peeping portion 103 is equal or close to each other, which can enhance the effect of light refraction.

The light-transmissive portion 12 of the first anti-peeping portion 101 can be made of a first material, the light-transmissive portion 12 of the second anti-peeping portion 102 can be made of a second material, and the light-transmissive portion 12 of the third anti-peeping portion 103 can be made of a third material. The light-transmissive portions 12 of the first anti-peeping portion 101, the second anti-peeping portion 102, and the third anti-peeping portion 103 can be composed of resin. By adding materials with differing refractive indices to the resin, a refractive index of the light-transmissive portion 12 of the first anti-peeping portion 101, a refractive index of the light-transmissive portion 12 of the second anti-peeping portion 102, and a refractive index of the light-transmissive portion 12 of the third anti-peeping portion 103 can be adjusted.

The refractive index of the first material is lower than the refractive index of the second material, and the refractive index of the second material is lower than the refractive index of the third material. Consequently, when light enters the anti-peeping film from the light incident surface, the refractive indices of the light-transmissive portions 12 in the first anti-peeping portion 101, the second anti-peeping portion 102, and the third anti-peeping portion 103 differ, causing refraction at the interfaces. It should be noted that because the refractive index of the material on the light-emitting side is higher than the refractive index of the material on the light-incident side, the refraction angle of the light is smaller than the incident angle. This causes the outgoing direction of the refracted light to be closer to the normal of the incident light, leading to light convergence and thereby enhancing display brightness.

Furthermore, please refer to FIG. 3. The light-blocking portion 11 includes the first film layer 111 and the second film layer 112, and the first film layer 111 is light-transmissive. Consequently, when a first light ray S1 enters from the light incident surface of the anti-peeping film, refraction occurs at the interface between the first anti-peeping portion 101 and the second anti-peeping portion 102, resulting in the formation of a second light ray S2. The refraction angle of the second light ray S2 is smaller than an incident angle of the first light ray S1. The second light ray S2 then undergoes refraction at the interface between the second anti-peeping portion 102 and the third anti-peeping portion 103, forming a third light ray S3. The refraction angle of the third light ray S3 is smaller than an incident angle of the second light ray S2. This causes the convergence of the first light ray S1 toward the normal direction, leading to light convergence and an increase in display brightness.

In the anti-peeping film of the present application, the quantities of the anti-peeping layer 10 included in the first anti-peeping portion 101, the second anti-peeping portion 102, and the third anti-peeping portion 103 are different.

In the present embodiment, the quantities of the anti-peeping layer 10 included in the first anti-peeping portion 101, the second anti-peeping portion 102, and the third anti-peeping portion 103 can be adjusted, so that the outgoing angle of the light meets the requirements for anti-peeping effectiveness.

In the anti-peeping film of the present application, the spacing P2 between the adjacent two light-blocking portions of the second anti-peeping portion is m times the spacing P1 between the adjacent two light-blocking portions of the first anti-peeping portion, and the spacing P2 between the adjacent two light-blocking portions of the second anti-peeping portion is n times the spacing P3 between the adjacent two light-blocking portions of the third anti-peeping portion; wherein, m and n are integers greater than 1.

In the present embodiment, please refer to FIG. 4. The spacing P1 between the adjacent two light-blocking portions 11 of the first anti-peeping portion refers to a distance between centerlines of the adjacent light-blocking portions 11 in the first anti-peeping portion 101. The spacing P2 between the adjacent two light-blocking portions 11 of the second anti-peeping portion 102 refers to a distance between centerlines of the adjacent light-blocking portions 11 in the second anti-peeping portion 102. The spacing P3 between the adjacent two light-blocking portions 11 of the third anti-peeping portion 103 refers to a distance between centerlines of the adjacent light-blocking portions 11 in the third anti-peeping portion 103.

In some embodiments, please refer to FIG. 4. The spacing P2 between the adjacent two light-blocking portions 11 of the second anti-peeping portion is 2 times the spacing P1 between the adjacent two light-blocking portions 11 of the first anti-peeping portion. Further, the spacing P2 between the adjacent two light-blocking portions 11 of the second anti-peeping portion is 2 times the spacing P3 between the adjacent two light-blocking portions 11 of the third anti-peeping portion. In this case, m is 2, and n is 2. This further increases the light transmittance of the second anti-peeping portion 102, enhancing the overall light transmittance of the anti-peeping film. The values of m and n can be adjusted based on the actual requirements for light transmittance.

In the anti-peeping film of the present application, the width of the light-blocking portion 11 ranges from greater than 0 micrometers to less than or equal to 1 micrometer. The thickness of the anti-peeping layer ranges from 30 nanometers to 150.02 nanometers.

In some embodiments, when the width of the light-blocking portion 11 is 0.7 micrometers, the width of the light-transmissive portion 12 ranges from 8 micrometers to 15.6 micrometers. This ensures that the ratio of the width of the light-blocking portion 11 to the width of the light-transmissive portion 12 falls within the range of 0.045:1 to 0.088:1, thereby enhancing the light transmittance of the anti-peeping film while maintaining its anti-peeping effect.

In some embodiments, the width of the light-blocking portion 11 can be adjusted as needed. When the width of the light-blocking portion 11 changes, the width of the light-transmissive portion 12 can be adaptively adjusted to ensure that the ratio of the width of the light-blocking portion 11 to the width of the light-transmissive portion 12 falls within the range of 0.045:1 to 0.088:1.

In some embodiments, the thickness of the anti-peeping layer ranges from 30 nanometers to 150.02 nanometers. In this case, the thickness of each light-blocking portion 11 is the sum of the thicknesses of the first film layer 111 and the second film layer 112, and the thickness of each light-transmissive portion 12 is equal to the thickness of the second film layer 112. Specifically, the thickness of the first film layer 111 ranges from 30 nanometers to 150 nanometers, while the thickness of the second film layer 112 ranges from 0.002 nanometers to 0.02 nanometers.

In the anti-peeping film of the present application, the cross-sectional shape of the light-blocking portion 11 is rectangular, and the material of the light-blocking portion 11 includes black dye.

In the present embodiment, in the anti-peeping film formed by stacking multiple anti-peeping layers 10, the cross-sectional shape of the light-blocking portion 11 is rectangular in the sectional view direction. This ensures that the light output efficiency is consistent between the light incident surface and the light exit surface, thereby enhancing the light extraction efficiency. The material of the light-blocking portion 11 includes black dye. For example, the material of the light-blocking portion 11 can be black ink, and the material of the light-transmissive portion 12 can be transparent resin.

In some embodiments, the cross-sectional shape of the light-blocking portion 11 can also be adjusted according to actual needs. For instance, the cross-sectional shape of the light-blocking portion 11 can be trapezoidal, elliptical, or other shapes. When the cross-sectional shape of the light-blocking portion 11 is trapezoidal, in a top view direction of the anti-peeping film, the light-blocking portions 11 of the multiple anti-peeping layers 10 overlap. Additionally, in the second direction Y, the width of the light-blocking portion 11 in the anti-peeping layer 10 closer to the light exit surface is smaller than the width of the light-blocking portion 11 in the anti-peeping layer 10 farther from the light exit surface. This enhances the anti-peeping effect of the anti-peeping film.

Referring to FIG. 5, in the anti-peeping film of the present application, the anti-peeping film further includes a base layer 113 disposed on the light incident surface of the anti-peeping film and a functional layer 114 disposed on the light exit surface of the anti-peeping film.

Referring to FIG. 5, in the present embodiment, the base layer 113 is disposed on the light incident surface of the anti-peeping film. The material of the base layer 113 includes polyethylene terephthalate (PET), polycarbonate (PC), and the like. The base layer 113 can provide protection for the light incident surface of the anti-peeping film. The functional layer 114 is disposed on the light exit surface of the anti-peeping film. The functional layer 114 can be made of same or different materials as the substrate layer 113. For example, the functional layer 114 can be made of the same material as the substrate layer 113, including polyethylene terephthalate (PET), polycarbonate (PC), and the like, thus providing protection for the light exit surface of the anti-peeping film.

In the present embodiment, the thickness of the base layer 113 is from 0.5 millimeters to 2 millimeters. The thickness of the functional layer 114 is from 0.5 millimeters to 2 millimeters. When the base layer 113 and the functional layer 114 are thicker, the protective capability for the anti-peeping layer 10 is improved. When the base layer 113 and the functional layer 114 are thinner, the overall thickness of the anti-peeping film is reduced, thereby decreasing the total thickness of the display device.

In some embodiments, the functional layer 114 can adopt an anti-glare hard coating to enhance the anti-glare and protective effects of the anti-peeping film. The functional layer 114 can also use conventional film layers commonly used in this field, and the present application does not impose any restrictions in this regard.

In the present embodiment, an adhesive layer can be placed between the base layer 113 and the light incident surface of the anti-peeping film, so that the base layer 13 is closely attached to the light incident surface of the anti-peeping film. An adhesive layer can be placed between the functional layer 114 and the light exit surface of the anti-peeping film, so that the functional layer 114 is closely attached to the light exit surface of the anti-peeping film.

In the present embodiment, the thickness of each light-blocking portion 11 is the sum of the thicknesses of the first film layer 111 and the second film layer 112, and the thickness of each light-transmissive portion 12 is equal to the thickness of the second film layer 112. Specifically, the first film layer 111 can be made of transparent resin, and the second film layer 112 can be made of black ink. Specifically, the thickness of the first film layer 111 ranges from 30 nanometers to 150 nanometers, and the thickness of the second film layer 112 ranges from 0.002 nanometers to 0.02 nanometers.

The first film layer 111 can be formed by stretching a transparent resin film. Since resin films can be bonded under the action of molecular forces without tearing, a thickness of the stretched resin film can be one hundred thousandth of an original thickness. The second film layer 112 can be formed by producing multiple columns of black ink in a strip pattern on the first film layer 111. The black ink forms strip structures with equal-width and distributed in parallel and equal intervals.

It should be noted that methods for producing black ink include ultra-high precision ink screen printing, chemical vapor deposition (CVD), and other processes, and the present application does not impose any restrictions in this regard. The second film layer 112 can be produced before or after the stretching of the resin film. According to the size relationship between the light-blocking portion 11 and the light-transmissive portion 12, the width of the second film layer 112 can be adjusted, thereby ensuring that the ratio of the width of the light-blocking portion 11 to the width of the light-transmissive portion 12 of the finished anti-peeping film falls within the range of 0.045:1 to 0.088:1, thereby enhancing the light transmittance of the anti-peeping film.

In the present embodiment, after completing the fabrication of one single anti-peeping layer 10, multiple anti-peeping layers 10 are then stacked. For example, the anti-peeping film can include from 800 to 8000 anti-peeping layers 10. The total thickness of the anti-peeping layers 10 is related to the anti-peeping angle A, and the number of the anti-peeping layers 10 can be adjusted based on the requirements of the anti-peeping angle A, and this application does not impose any restrictions in this regard.

It should be noted that during a process of stacking multiple anti-peeping layers 10, each two adjacent anti-peeping layers 10 are closely adhered without leaving gaps, thus preventing the presence of air within the gaps and avoiding any impact on the transmission and propagation of light.

The present application further provides a display device. The display device includes the anti-peeping film mentioned above.

In the present embodiment, the display device includes a display panel. The anti-peeping film is disposed on a light-emitting side of the display panel. The light incident surface is attached to the light-emitting side of the display panel.

In the present embodiment, the display device includes any product or component with display functionality, such as mobile phones, tablets, televisions, monitors, laptops, digital photo frames, navigation systems, and more. For instance, the anti-peeping film can be applied to in-car display devices, display devices in industrial control fields, and so on.

In the foregoing embodiments, the descriptions of each embodiment have their own emphases, and for parts not described in detail in a certain embodiment, reference may be made to relevant descriptions of other embodiments.

The anti-peeping film and the display device of the present application are described in detail above. In the present disclosure, specific examples are used to illustrate the principles and implementation methods of the present application. The descriptions of the above embodiments are only used to help understand the technical solution and the main idea of this application. Those skilled in the art should understand that they can modify the technical solutions described in the foregoing embodiments or perform equivalent replacements for some of the technical features. Such modifications or replacements do not depart from the essence of the corresponding technical solutions and should be deemed to fall within the protection scope of the technical solutions of the present application.

What is claimed is:

1. An anti-peeping film, comprising a plurality of anti-peeping layers stacked on each other, wherein each of the anti-peeping layers comprises:

multiple light-blocking portions arranged in parallel; and a plurality of light-transmissive portions, each of the light-transmissive portions connected between adjacent two of the light-blocking portions;

wherein a ratio of a width of each of the light-blocking portions in an arrangement direction to a width of each of the light-transmissive portions in the arrangement direction ranges from 0.045:1 to 0.088:1;

wherein a number of the anti-peeping layers comprised in the anti-peeping film is from 800 to 8000 layers;

wherein along a direction from a light incident surface of the anti-peeping film towards a light exit surface of the anti-peeping film, the anti-peeping film comprises a first anti-peeping portion, a second anti-peeping portion, and a third anti-peeping portion stacked on each other; and each of the first anti-peeping portion, the second anti-peeping portion, and the third anti-peeping portion comprises multiple ones of the anti-peeping layers, a refractive index of each of the light-transmissive portions in the first anti-peeping portion is lower than a refractive index of each of the light-transmissive portions in the second anti-peeping portion, and a refractive index of each of the light-transmissive portions in the second anti-peeping portion is lower than a refractive index of each of the light-transmissive portions in the third anti-peeping portion.

2. The anti-peeping film according to claim 1, wherein each of the light-blocking portions comprises a first film layer and a second film layer, wherein in each of the light-blocking portions, a light transmittance of the second film layer is lower than a light transmittance of the first film layer, and a thickness of the second film layer is smaller than a thickness of the first film layer.

3. The anti-peeping film according to claim 1, wherein the first anti-peeping portion, the second anti-peeping portion, and the third anti-peeping portion comprise different numbers of the anti-peeping layers.

4. The anti-peeping film according to claim 1, wherein a spacing between adjacent two of the light-blocking portions in the second anti-peeping portion is m times a spacing between adjacent two of the light-blocking portions in the first anti-peeping portion, and a spacing between adjacent two of the light-blocking portions in the second anti-peeping portion is n times a spacing between adjacent two of the light-blocking portions in the third anti-peeping portion; and wherein m and n are integers greater than 1.

5. The anti-peeping film according to claim 1, wherein a width of each of the light-blocking portions ranges from greater than 0 micrometers to less than or equal to 1 micrometer; and a thickness of each of the anti-peeping layers ranges from 30 nanometers to 150.02 nanometers.

6. The anti-peeping film according to claim 1, wherein a cross-sectional shape of each of the light-blocking portions comprises a rectangle, and a material of the light-blocking portions comprises black dye.

7. The anti-peeping film according to claim 1, wherein the anti-peeping film further comprises a base layer disposed on a light incident surface of the anti-peeping film and a functional layer disposed on a light exit surface of the anti-peeping film.

8. A display device, comprising an anti-peeping film, wherein the anti-peeping film comprises a plurality of anti-peeping layers staked on each other, each of the anti-peeping layers comprising:

multiple light-blocking portions arranged in parallel; and a plurality of light-transmissive portions, each of the light-transmissive portions connected between adjacent two of said light-blocking portions;

wherein a ratio of a width of each of the light-blocking portions in an arrangement direction to a width of each of the light-transmissive portions in the arrangement direction ranges from 0.045:1 to 0.088:1;

wherein a number of the anti-peeping layers comprised in the anti-peeping film is from 800 to 8000 layers;

wherein along a direction from a light incident surface of the anti-peeping film towards a light exit surface of the anti-peeping film, the anti-peeping film comprises a first anti-peeping portion, a second anti-peeping portion, and a third anti-peeping portion stacked on each other; and each of the first anti-peeping portion, the second anti-peeping portion, and the third anti-peeping portion comprises multiple ones of the anti-peeping layers, a refractive index of each of the light-transmissive portions in the first anti-peeping portion is lower than a refractive index of each of the light-transmissive portions in the second anti-peeping portion, and a refractive index of each of the light-transmissive portions in the second anti-peeping portion is lower than a refractive index of each of the light-transmissive portions in the third anti-peeping portion.

9. The display device according to claim 8, wherein each of the light- blocking portions comprises a first film layer and a second film layer, wherein in each of the light-blocking portions, a light transmittance of the second film layer is lower than a light transmittance of the first film layer, and a thickness of the second film layer is smaller than a thickness of the first film layer.

10. The display device according to claim 8, wherein the first anti-peeping portion, the second anti-peeping portion, and the third anti-peeping portion comprise different numbers of the anti-peeping layers.

11. The display device according to claim 8, wherein a spacing between adjacent two of the light-blocking portions in the second anti- peeping portion is m times a spacing between adjacent two of the light-blocking portions in the first anti-peeping portion, and a spacing between adjacent two of the light-blocking portions in the second anti-peeping portion is n times a spacing between adjacent two of the light-blocking portions in the third anti-peeping portion; and
   wherein m and n are integers greater than 1.

12. The display device according to claim 8, wherein a width of each of the light-blocking portions ranges from greater than 0 micrometers to less than or equal to 1 micrometer; and
   a thickness of each of the anti-peeping layers ranges from 30 nanometers to 150.02 nanometers.

13. The display device according to claim 8, wherein a cross-sectional shape of each of the light-blocking portions comprises a rectangle, and a material of the light-blocking portions comprises black dye.

14. The display device according to claim 8, wherein the anti-peeping film further comprises a base layer disposed on a light incident surface of the anti-peeping film and a functional layer disposed on a light exit surface of the anti-peeping film.

15. An anti-peeping film, comprising a plurality of anti-peeping layers stacked on each other, wherein each of the anti-peeping layers comprises:
   multiple light-blocking portions arranged in parallel; and
   a plurality of light-transmissive portions, each of the light-transmissive portions connected between adjacent two of the light-blocking portions;
   wherein a ratio of a width of each of the light-blocking portions in an arrangement direction to a width of each of the light-transmissive portions in the arrangement direction ranges from 0.045:1 to 0.088:1;
   wherein a number of the anti-peeping layers comprised in the anti-peeping film is from 800 to 8000 layers;
   wherein along a direction from a light incident surface of the anti-peeping film towards a light exit surface of the anti-peeping film, the anti-peeping film comprises a first anti-peeping portion, a second anti-peeping portion, and a third anti-peeping portion stacked on each other;
   each of the first anti-peeping portion, the second anti-peeping portion, and the third anti-peeping portion comprises multiple ones of the anti-peeping layers, a refractive index of each of the light-transmissive portions in the first anti-peeping portion is lower than a refractive index of each of the light-transmissive portions in the second anti-peeping portion, and a refractive index of each of the light-transmissive portions in the second anti-peeping portion is lower than a refractive index of each of the light-transmissive portions in the third anti-peeping portion; and
   wherein the first anti-peeping portion, the second anti-peeping portion, and the third anti-peeping portion comprise different numbers of the anti-peeping layers.

16. The anti-peeping film according to claim 15, wherein each of the light-blocking portions comprises a first film layer and a second film layer, wherein in each of the light-blocking portions, a light transmittance of the second film layer is lower than a light transmittance of the first film layer, and a thickness of the second film layer is smaller than a thickness of the first film layer.

17. The anti-peeping film according to claim 15, wherein a width of each of the light-blocking portions ranges from greater than 0 micrometers to less than or equal to 1 micrometer; and
   a thickness of each of the anti-peeping layers ranges from 30 nanometers to 150.02 nanometers.

18. The anti-peeping film according to claim 15, wherein a cross-sectional shape of each of the light-blocking portions comprises a rectangle, and a material of the light-blocking portions comprises black dye.

19. The anti-peeping film according to claim 15, wherein the anti-peeping film further comprises a base layer disposed on a light incident surface of the anti-peeping film and a functional layer disposed on a light exit surface of the anti-peeping film.

* * * * *